United States Patent
Roesch et al.

(10) Patent No.: US 7,078,616 B2
(45) Date of Patent: Jul. 18, 2006

(54) FLOOR BOX

(75) Inventors: Mark A. Roesch, Brecksville, OH (US); David A. Maccarone, Hudson, OH (US); Dennis P. Revlock, Sr., Medina, OH (US)

(73) Assignee: The Lamson & Sessions Co., Cleveland, OH (US)

(*) Notice: Subject to any disclaimer, the term of this patent is extended or adjusted under 35 U.S.C. 154(b) by 0 days.

(21) Appl. No.: 10/948,852

(22) Filed: Sep. 24, 2004

(65) Prior Publication Data

US 2006/0065420 A1    Mar. 30, 2006

(51) Int. Cl.
*H02G 3/04* (2006.01)

(52) U.S. Cl. .................. 174/48; 174/68.1; 52/220.8

(58) Field of Classification Search .................. 174/48, 174/68.1, 68.3; 52/220.8, 220.7; 312/126; 439/535; 248/906
See application file for complete search history.

(56) References Cited

U.S. PATENT DOCUMENTS

| | | | |
|---|---|---|---|
| 579,560 A | 3/1897 | Caillet | |
| 1,259,612 A | 3/1918 | Friedel | |
| 2,033,602 A | 3/1936 | Adam | 247/19 |
| 2,886,630 A | 5/1959 | Gill | 174/57 |
| 3,027,416 A | 3/1962 | Kissel | 174/57 |
| 3,049,688 A | 8/1962 | Sinopoli | 339/12 |
| 3,112,891 A * | 12/1963 | Cutler | 362/216 |
| 3,643,132 A | 2/1972 | Odmark | 317/107 |
| 3,790,923 A | 2/1974 | Mathe | 339/128 |
| 3,956,573 A | 5/1976 | Myers et al. | 174/48 |
| 4,725,249 A | 2/1988 | Blackwood et al. | 439/535 |
| 4,770,643 A | 9/1988 | Castellani et al. | 439/135 |
| 4,883,924 A | 11/1989 | Hadfield | 174/48 |
| 4,986,779 A | 1/1991 | Ferrill et al. | 439/108 |
| 5,032,690 A | 7/1991 | Bloom | 174/48 |
| 5,046,956 A | 9/1991 | Takano | 439/78 |
| 5,064,969 A | 11/1991 | Bloom | 174/67 |
| 5,107,072 A | 4/1992 | Morgan | 174/48 |
| 5,178,554 A | 1/1993 | Siemon et al. | 439/188 |
| 5,250,770 A | 10/1993 | Cummings | 200/295 |
| 5,272,278 A | 12/1993 | Wuertz | 174/48 |
| 5,393,930 A | 2/1995 | Wuertz | 174/48 |
| 5,410,103 A | 4/1995 | Wuertz | 174/48 |
| 5,422,434 A | 6/1995 | Wuertz et al. | 174/48 |
| 5,466,886 A | 11/1995 | Lengyel et al. | 174/48 |
| 5,518,132 A | 5/1996 | Chen | 220/3.8 |
| 5,547,095 A | 8/1996 | Sonntag et al. | 220/3.8 |
| 5,696,349 A | 12/1997 | Bera | 174/48 |
| 5,744,750 A | 4/1998 | Almond | 174/49 |
| 5,763,826 A | 6/1998 | Castellani et al. | 174/48 |
| 5,803,758 A | 9/1998 | Kameyama | 439/248 |
| 6,018,126 A | 1/2000 | Castellani et al. | 174/48 |
| 6,114,623 A | 9/2000 | Bonilla et al. | 174/48 |
| 6,307,152 B1 | 10/2001 | Bonilla et al. | 174/48 |
| 6,353,180 B1 | 3/2002 | DeBartolo, Jr. et al. | 174/48 |
| 2001/0016431 A1 | 8/2001 | Sawayanagi et al. | 439/34 |

* cited by examiner

*Primary Examiner*—Dhiru R. Patel
(74) *Attorney, Agent, or Firm*—Jones Day

(57) ABSTRACT

A small round floor box installs through a two inch diameter hole in a floor to provide a small footprint that improves the appearance of the installation and makes it less obtrusive. The box accommodates a single power receptacle or data plugs that attach to mounting plates that snap connect within the box.

17 Claims, 7 Drawing Sheets

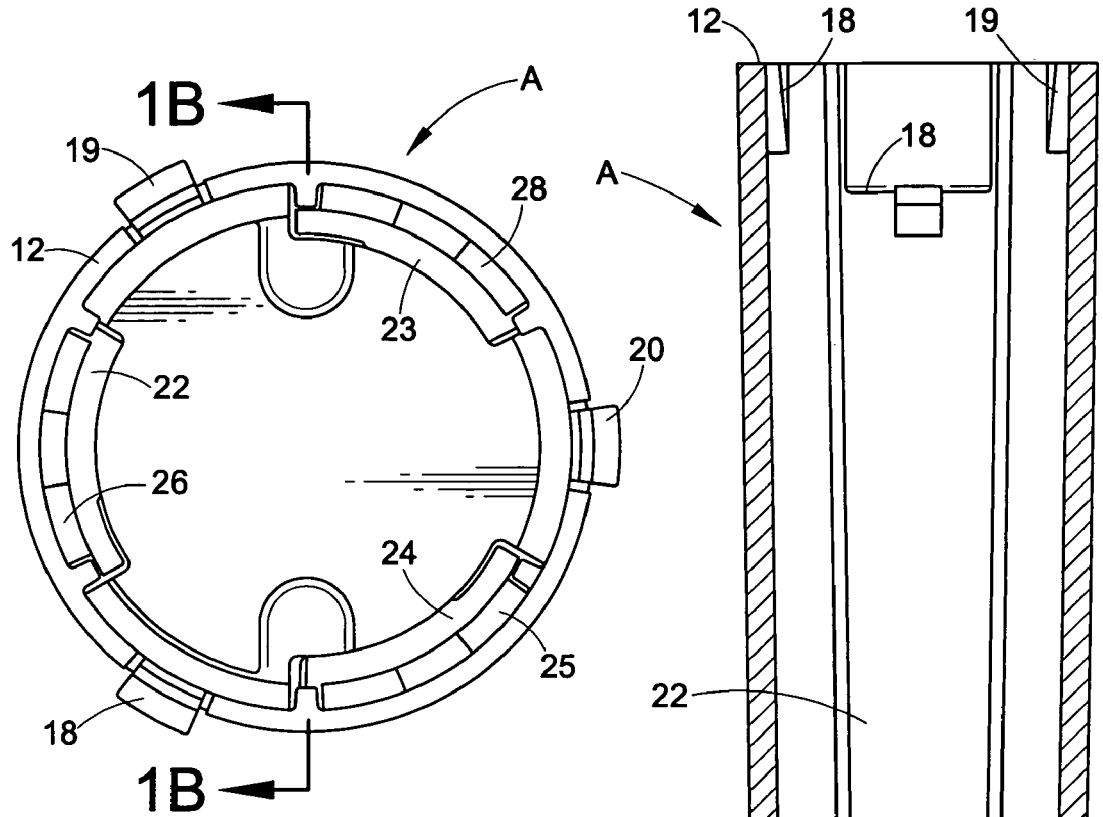
FIG. 1A
FIG. 1B
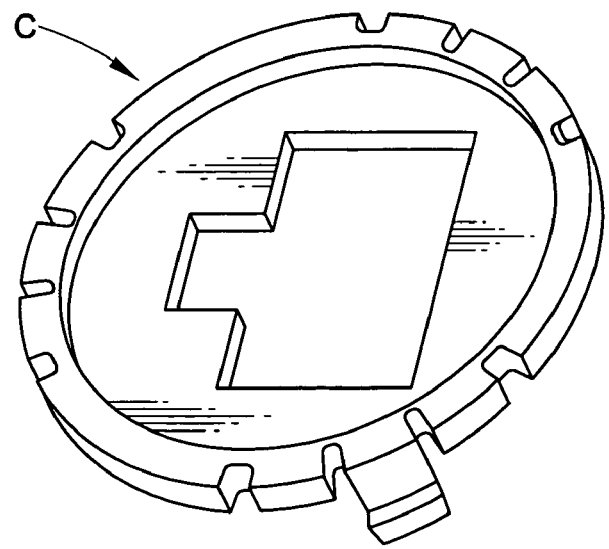
FIG. 2

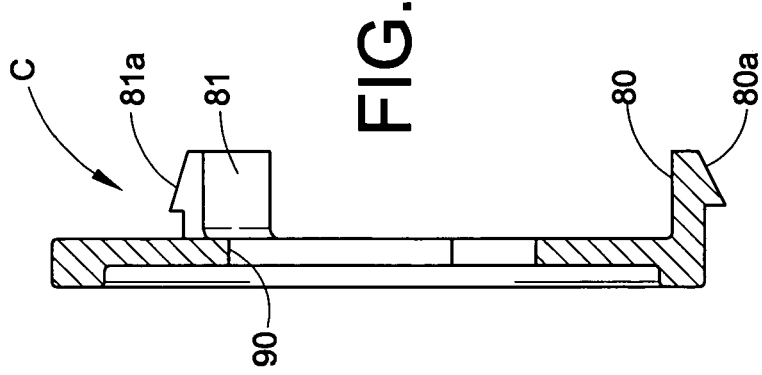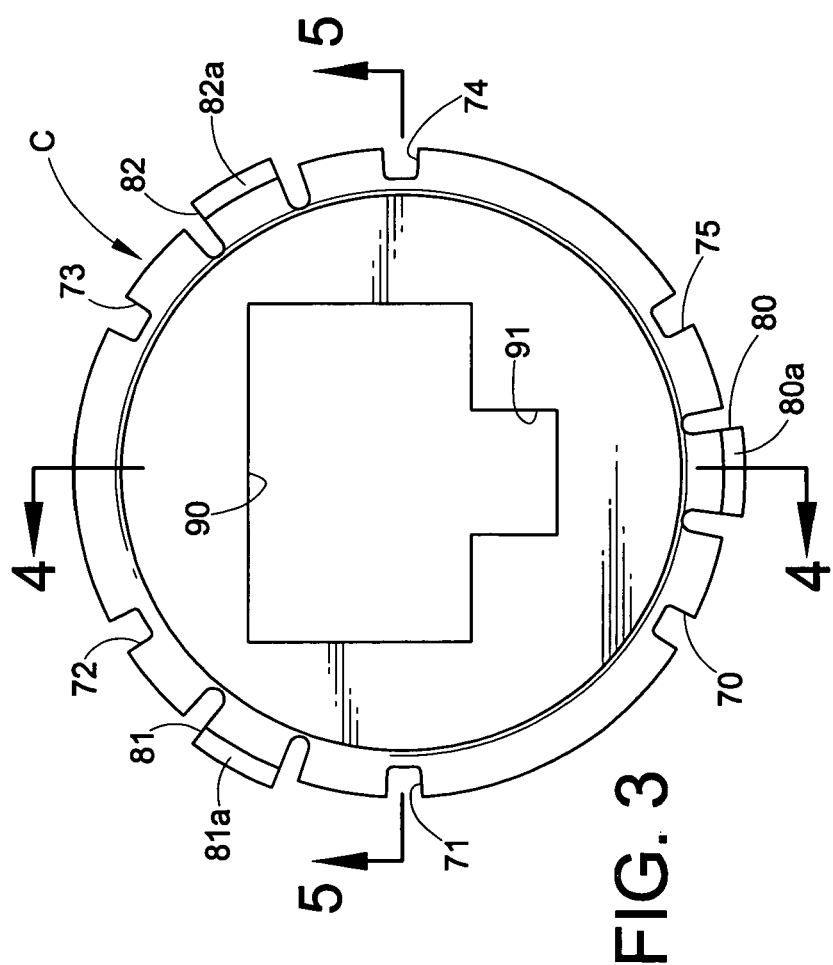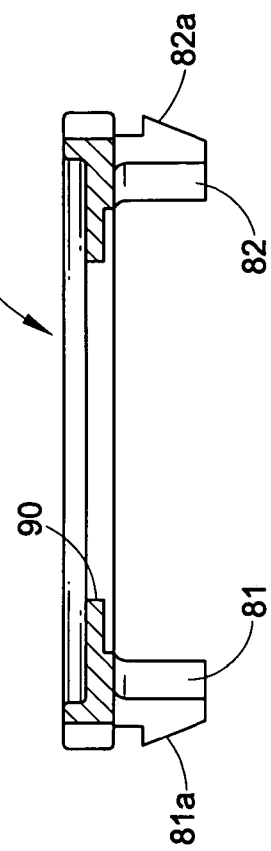

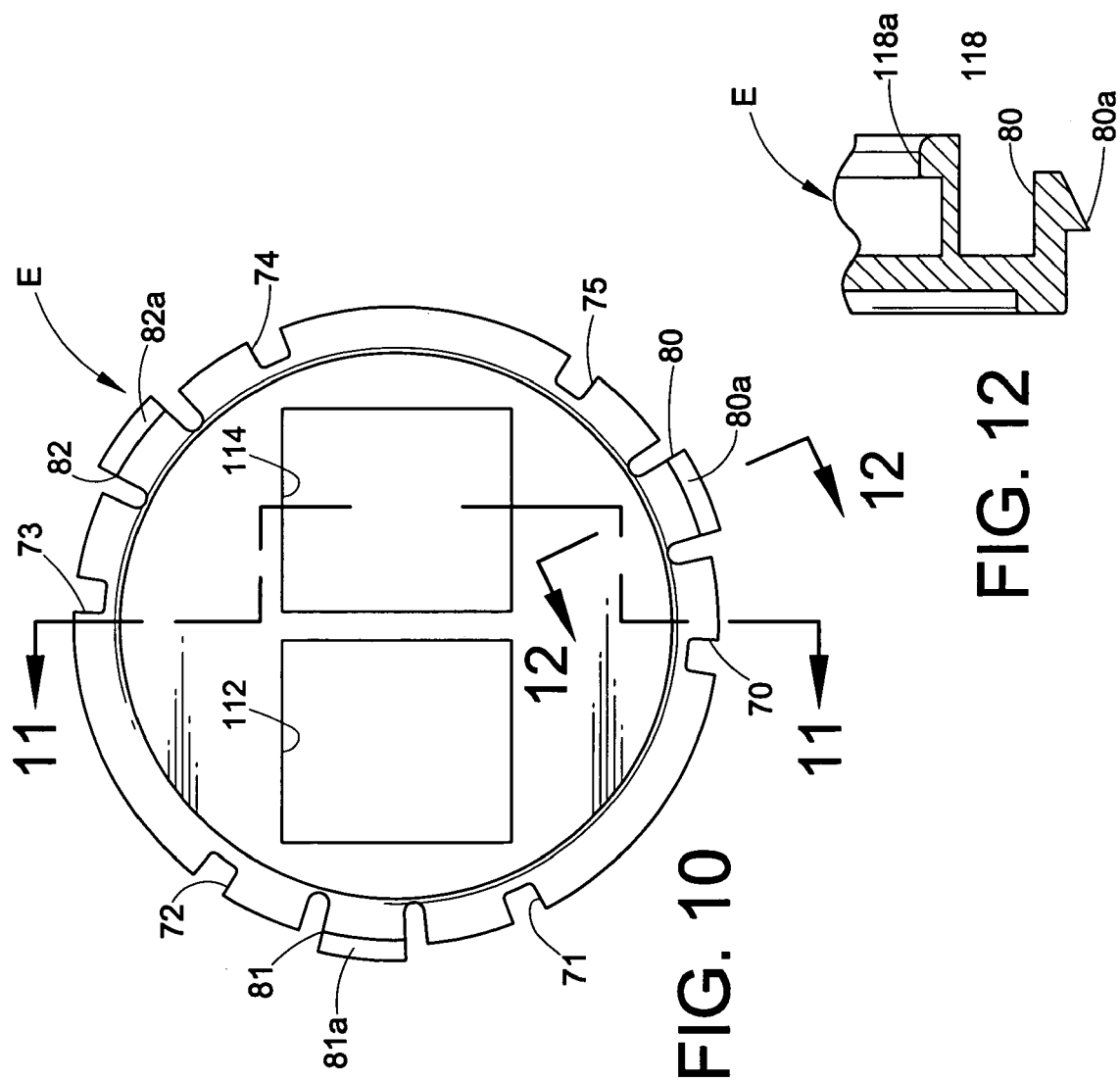

FLOOR BOX

BACKGROUND

This application relates to the art of floor boxes in which power receptacles or data connectors are mounted.

SUMMARY

A floor box is configured for installation through a hole in a floor that is around two inches in diameter. This small size provides a more pleasing and less obtrusive appearance.

The box is a generally cylindrical tubular body of plastic material.

Integral latches on the top portion of the box are provided for attaching a circular flange thereto.

Support shoulders within the box spaced from the top end thereof are provided for supporting a mounting plate on which a power receptacle or data connectors are mounted.

Radial openings in the wall of the box adjacent the support shoulders receive latches on a mounting plate for securing the mounting plate within the box.

DESCRIPTION OF THE DRAWING

FIG. 1A is a plan view of the top end of the floor box;

FIG. 1B is a cross-sectional view taken generally on line 1B—1B of FIG. 1A;

FIG. 2 is a perspective illustration of a mounting plate for a power receptacle;

FIG. 3 is a top plan view thereof;

FIG. 4 is a cross-sectional elevational view taken generally on line 4-4 of FIG. 3;

FIG. 5 is a cross-sectional elevational view taken generally on line 5-5 of FIG. 3;

FIG. 10 is a top plan view thereof;

FIG. 11 is a cross-sectional elevational view taken generally on line 11—11 of FIG. 10;

FIG. 12 is a partial cross-sectional elevational view taken generally on line 12—12 of FIG. 10;

DESCRIPTION

Figure 1:
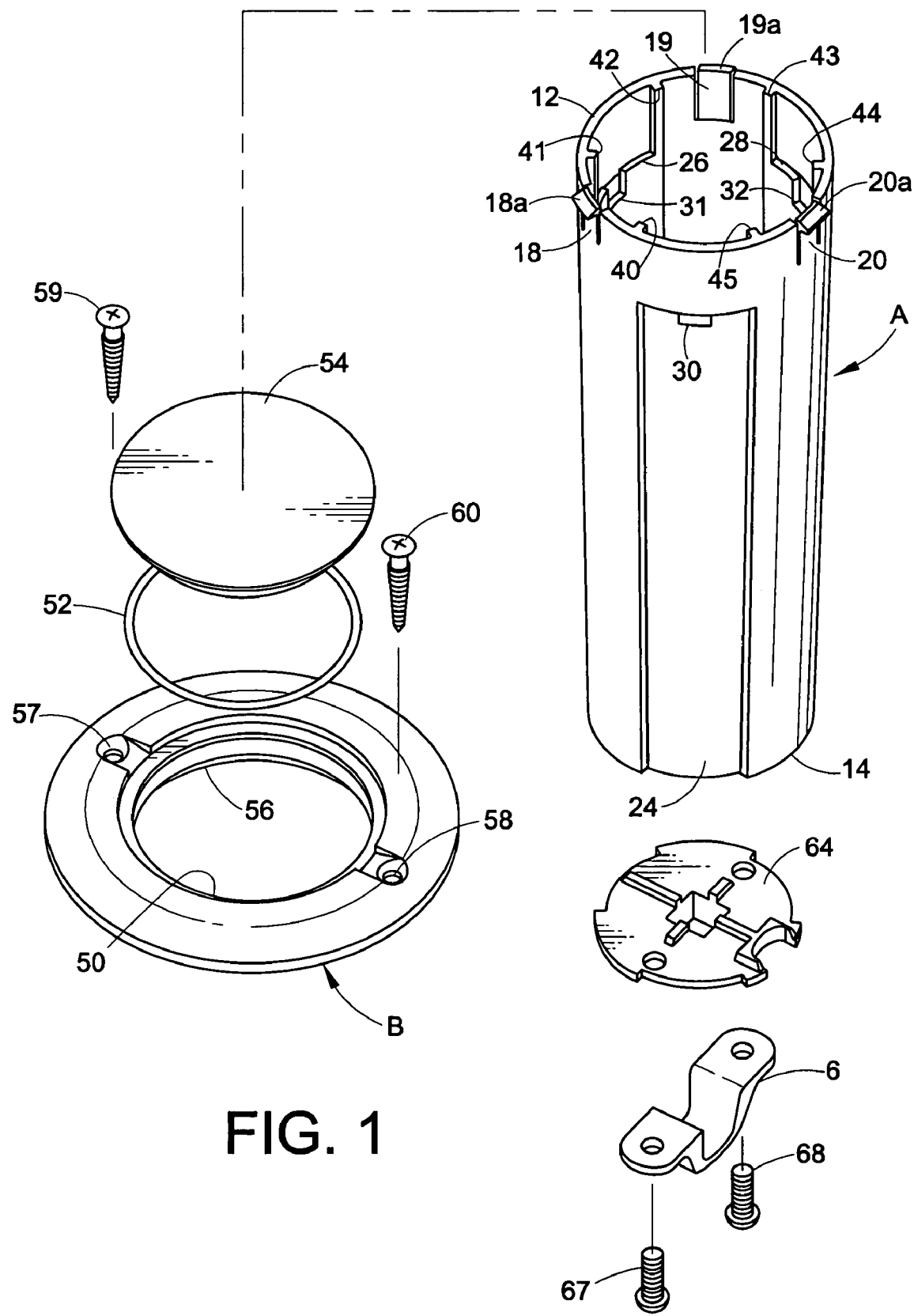
FIG. 1 is an exploded perspective illustration of a floor box in accordance with the present application.

Referring now to the drawing, wherein the showings are for purposes of illustrating a representative example of the floor box only and not for purposes of limiting same, FIG. 1 shows a floor box A in the form of a generally cylindrical plastic tubular body having a top end 12 and a bottom end 14. Box A has a slight inward taper from top-to-bottom as is apparent from FIGS. 1A and 1B so that it actually has a generally frusto-conical shape, but is referred to as generally cylindrical for convenience.

Three resilient latches 18, 19 and 20 are molded into the peripheral wall of the box at the upper end portion thereof, and the latches are circumferentially-spaced generally equidistantly therearound. The latches bend generally radially inwardly and outwardly of the tubular box and have outwardly extending latch projections 18a, 19a and 20a thereon with generally upwardly facing cam surfaces.

Three longitudinal channels 22, 23 and 24 are molded into box A from the outer surface thereof and extend from bottom end 14 to a location short of top end 12. The three channels are circumferentially-spaced generally equidistantly around the box and provide generally horizontal inwardly extending upwardly facing internal shoulders 25, 26 and 28 spaced downwardly from top end 12 of box A.

Generally rectangular holes 30, 31 and 32 are formed through the channels at the upper ends thereof and the shoulders 26, 28 are cut-away at the mid-point thereof in alignment with the holes so that there are a pair of shoulders on opposite sides of each hole.

A plurality of longitudinal ribs 40, 41, 42, 43, 44 and 45 are circumferentially-spaced generally equidistantly around the inside of box A at the top end portion thereof. The ribs extend as far as the shoulders 25, 26 and 28 at the upper ends of the channels.

A cover assembly includes a circular flange or ring member B having a central circular opening 50 therethrough for receiving an O-ring 52 and a circular cover 54. An inwardly extending circumferential lip 56 on the underside of flange B around opening 50 cooperates with latches 18-20 to hold the cover assembly on box A. Fastener receiving holes 57, 58 in flange B receive fasteners 59, 60 that extend into a floor in which the floor box is mounted.

Floor box A preferably is configured for insertion through an approximately two inch diameter hole that is cut into a floor. Thus, box A has an outside diameter that is less than two inches by an amount such that box A is closely received in the hole. The hole in the floor preferably is not greater than around 2.25 inches and the box A is dimensioned to have a relatively close fit through the hole at the box top end portion. However, it will be recognized that certain features of the floor box of the present application may be used with floor boxes having different dimensions and also may be used in different types of floor boxes.

A bottom cover 64 is configured for reception within a recess in the bottom end of box A. Bottom cover 64 and a strain relief clamp 63 are securable to box A by fasteners 67, 68 that thread into bores in bosses 65, 66 that extend inwardly from the inner surface of box A adjacent bottom end 14 thereof.

FIGS. 2-6 show a generally circular mounting plate C for a power receptacle. The outer diameter of mounting plate C is dimensioned for close sliding reception within the top end of box A. Grooves 70, 71, 72, 73, 74 and 75 extend inwardly of the outer periphery of mounting plate C and are circumferentially-spaced equidistantly therearound. Grooves 70–75 receive ribs 40–45 on box A when mounting plate C is inserted into the top end of box A and this properly aligns the mounting plate for attachment within the box.

Mounting plate C has three resilient latches 80, 81 and 82 circumferentially-spaced equidistantly therearound. Latches 80-82 have outwardly extending latch projections 80a, 81a and 82a that lie on the periphery of a circle having a diameter greater than the diameter of the internal surface at the top end of box A. Therefore, when mounting plate C is inserted into the top end of box A, cam surfaces on latch projections 80a, 81a and 82a engage the inner surface of the box so that the latches are bent inwardly. When the mounting plate is approximately resting on support shoulders 26, 28, the latch fingers snap outwardly and latch finger projections 80a, 81a and 82a project through holes 30–32 in box A to secure mounting plate C in position. A generally rectangular opening 90 with a central extension 91 on one side thereof is provided in mounting plate C for receiving a power receptacle.

Figure 7:
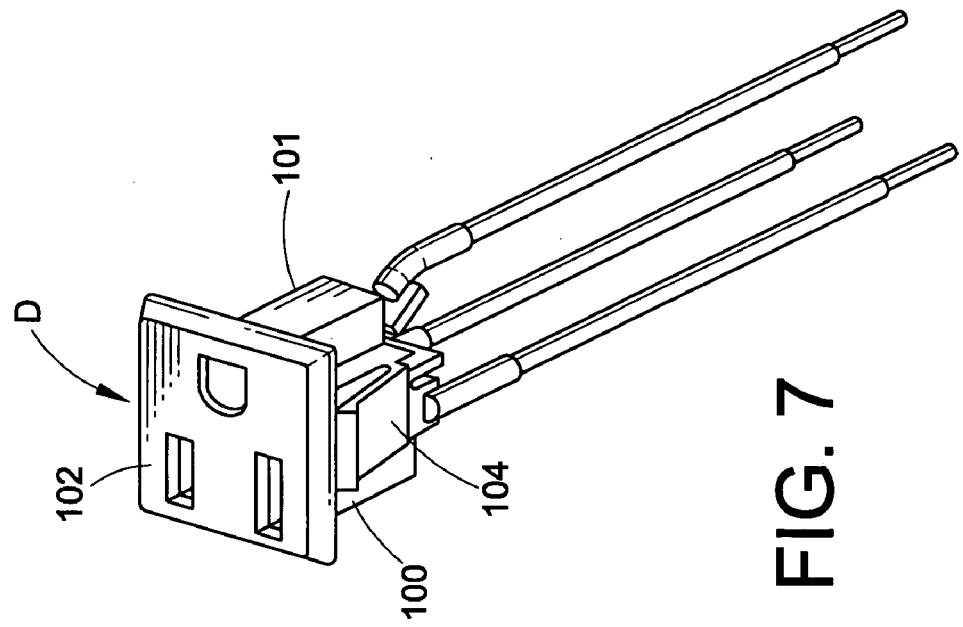
FIG. 7 is a perspective illustration of a power receptacle.
Figure 6:
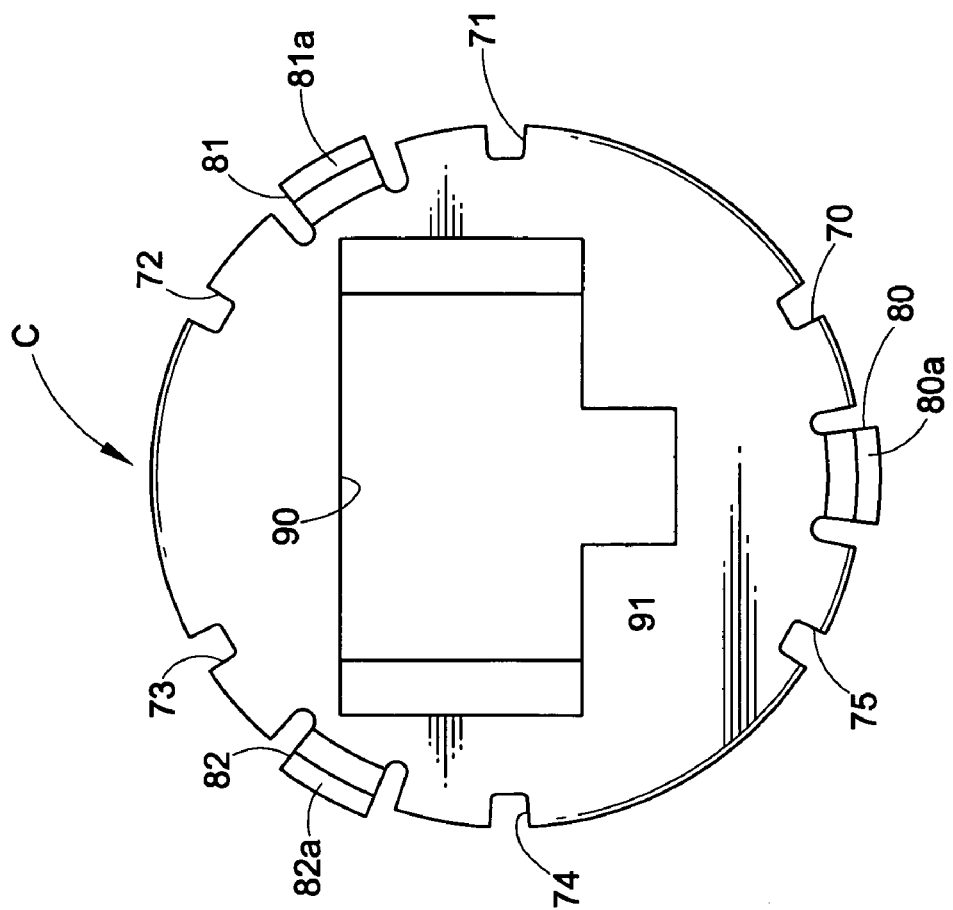
FIG. 6 is a bottom plan view thereof.
Figure 8:
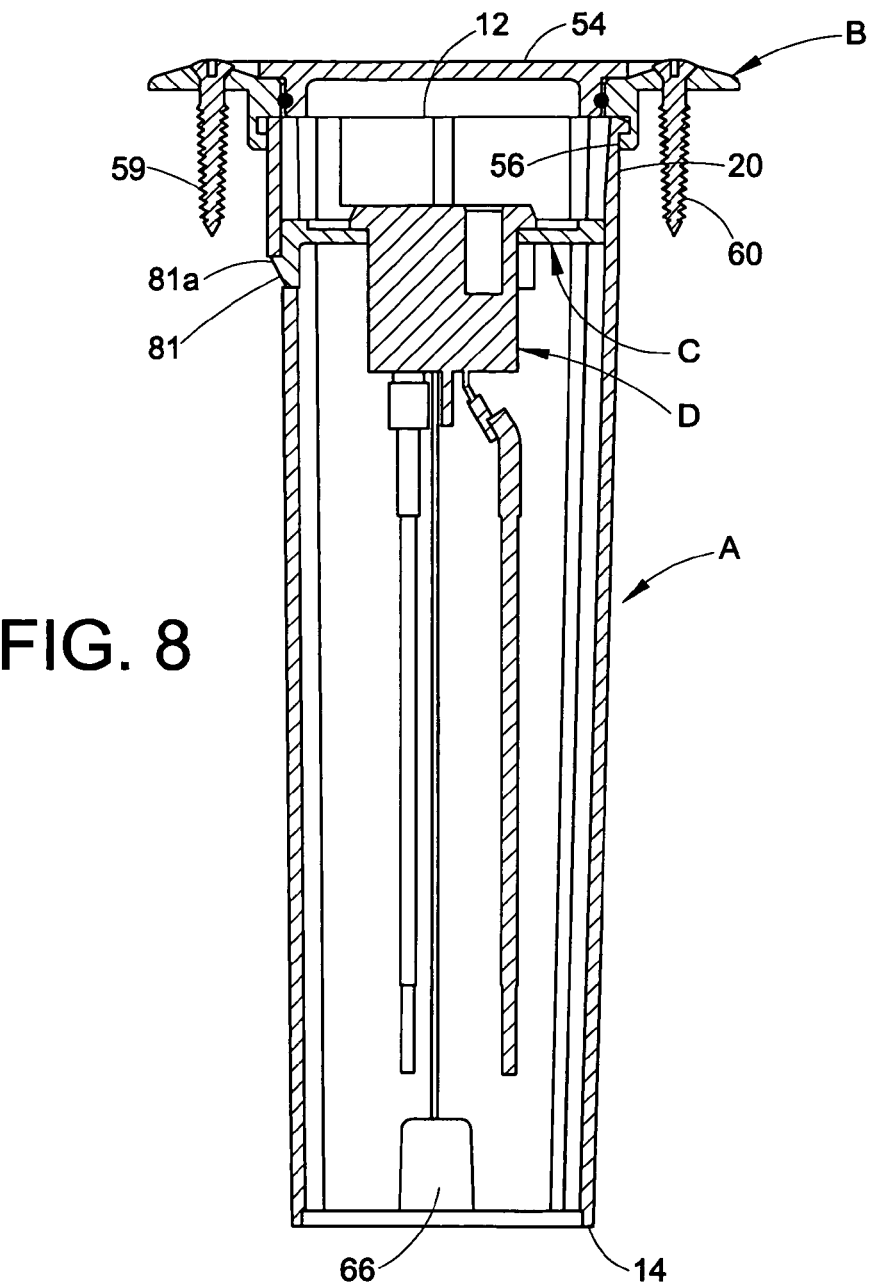
FIG. 8 is a cross-sectional elevational view of the floor box of FIG. 1 having the receptacle mounting plate of FIGS. 2-6 and the power receptacle of FIG. 7 mounted therein.
Figure 9:
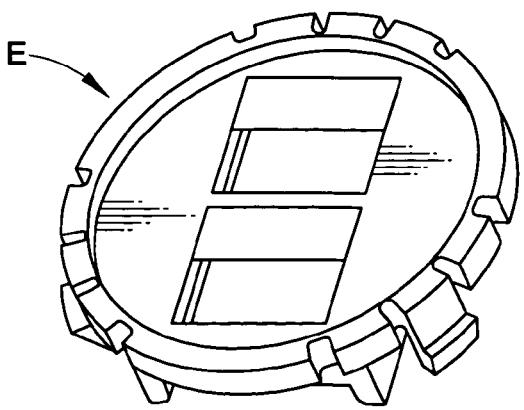
FIG. 9 is a perspective illustration of a mounting plate for a data connector.

FIG. 7 shows a conventional single receptacle having a body portion 100 with an extension 101 and a face plate 102. Face plate 102 extends outwardly beyond the outer periphery of body portion 100 and extension 101. A pair of opposite resilient latches, only one of which is shown at 104 in FIG. 7, are provided on body portion 100. Body portion 100 and extension 101 are closely receivable through opening 90, 91 in mounting plate C. Latches 104 then spring out on the underside of mounting plate C while the peripheral portion of face plate 102 is on the upper side of mounting place C. Thus, opposite peripheral portions of opening 90 are trapped between latches 104 and the underside of face plate 102 to hold receptacle D to mounting plate C.

FIGS. 9–13 show a mounting plate E for mounting one or more data connectors within box A. Mounting plate E has generally the same configuration as mounting plate C, and features of mounting plate E that are common with features of mounting plate C have been given the same reference numbers.

Mounting plate E has a pair of rectangular openings 112, 114 therethrough. Resilient latch members 116, 118 project from the underside of mounting plate E along the top and bottom ends of rectangular openings 112, 114. End walls 120, 122 project from the underside of mounting plate E at the outer ends of rectangular openings 112, 114.

Figure 14:
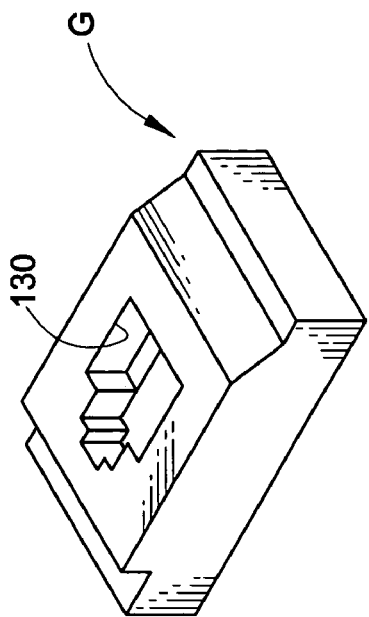
FIG. 14 is a perspective illustration of a data connector mountable on the mounting plate of FIGS. 9-13.

FIG. 14 shows a conventional data connector G, such as a category 5 connector, having a data connector socket 130 therein. Data connector G is receivable within latches 116, 118 from the underside of mounting plate E and latches 116, 118 bend outwardly as the data connector is inserted. The latch fingers then snap back toward one another so that latch projections 116, 118 engage the rear surface of data connector G to hold same in position with socket 130 accessible through openings 112 or 114. Obviously many of different types of data connectors can be mounted on a mounting plate.

Figure 15:
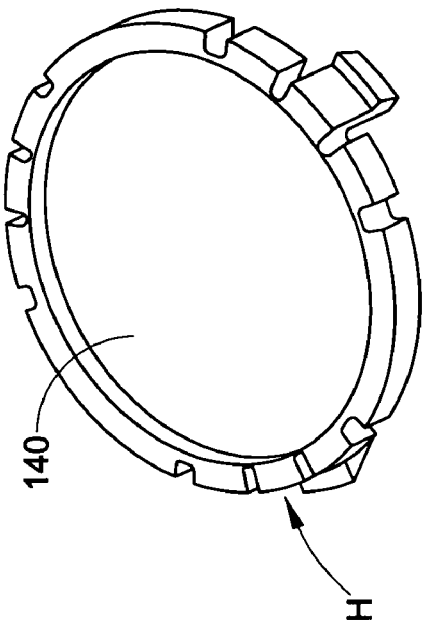
FIG. 15 is a perspective illustration of blank mounting plate.
Figure 13:
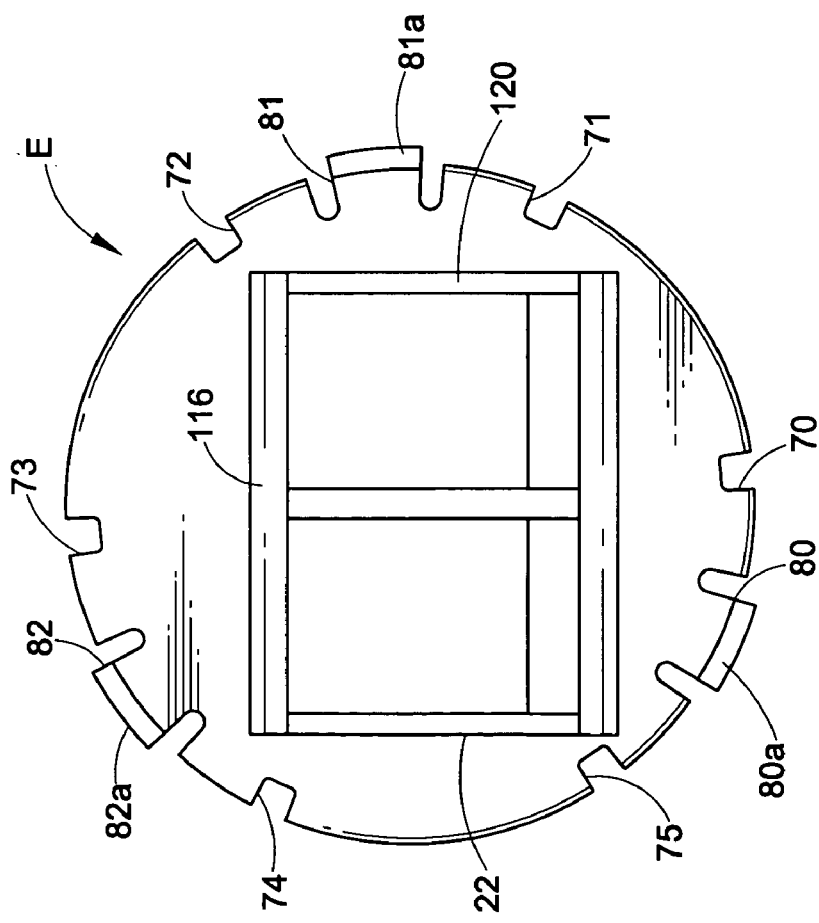
FIG. 13 is bottom plan view thereof.

FIG. 15 shows a blank mounting plate H having generally the same configuration as mounting plates C and E except that the central area 140 thereof has no opening therein. This permits an installer to cut his own special opening in the mounting plate for receiving special types of connectors.

To install the box, a two inch circular hole is cut in a floor with a hole saw. Flange B is attached to box A by way of box latches 18–20 and flange lip 56. Box A then is dropped into the hole until flange B stops against the floor surface around the hole. Fasteners 59, 60 then are extended through the holes in flange B and driven into the floor.

Nonmetallic sheathed cable or data wires extend into box A through the bottom thereof and out through the top. A power receptacle or data connector is attached to a mounting plate, and the wires are connected to the receptacle or data connector. The connected wires then are pushed down into box A, and the mounting plate C, E having a power receptacle or data connector mounted thereon is pushed into box A through the open top thereof until the mounting plate rests on shoulders 25, 26 and 28 with plate latches 80, 81 and 82 locked in box holes 30, 31 and 32. If there is nothing plugged into the box, the top opening is closed by cover 54 that is sealed around its perimeter by O-ring 52.

References to a connector include all types of connectors such as power receptacles, analog or digital data connectors and video connectors. The connectors may be for wires or fiber optic cable.

Although the floor box has been shown and described with reference to a representative embodiment, it is obvious that equivalent alterations and modifications will occur to others skilled in the art upon the reading and understanding of this application. Therefore, it is to be understood that the improvements to the floor box art may be practiced otherwise than as specifically described herein while remaining within the scope of the claims.

We claim:

1. A floor box comprising:
   a tubular body having a top end and a peripheral wall;
   a connector mounting plate receivable in said tubular body through said top end thereof;
   cooperating latches and recesses on said peripheral wall of tubular body and said mounting plate for attaching said mounting plate within said tubular body in spaced relationship to said top end of said tubular body; and
   said latches on said tubular body or said mounting plate being resilient for snap engagement with said recesses on said tubular body or said mounting plate.

2. The floor box of claim 1 wherein said tubular body has cover latches adjacent said top end thereof for attaching a flange ring to said tubular body.

3. The floor box of claim 1 wherein said latches are on said mounting plate and said recesses are in said peripheral wall of said tubular body and said recesses do not intersect said top end of said tubular body.

4. The floor box of claim 1 wherein said tubular body has a longitudinal axis and said latches extend generally parallel to said axis, said latches being resiliently bendable generally radially of said axis.

5. The floor box of claim 1 wherein said latches are on said mounting plate and said recesses are in said peripheral wail of said tubular body,
   said tubular body having a longitudinal axis and an inner surface with an inner diameter, said latches having outwardly extending latch projections with a latch projection outer diameter greater than said inner diameter, said latch projections having cam surfaces engageable with said inner surface to bend said latches toward said axis when said mounting plate is inserted into said tubular body, and said latches being outwardly bendable to snap said projections into said recesses when said latch projections are aligned with said recesses.

6. A floor box comprising:
   a generally cylindrical plastic tubular body configured for close reception through a circular hole having a diameter not greater than 2.25 inches;
   said body having an upper end with a plurality of latches for attaching a circular flange to said body; and
   said body having a top end and internal upwardly facing support shoulders longitudinally spaced from said top end for supporting a generally circular mounting plate thereon.

7. The flour box of claim 6 wherein said body has a peripheral wall with a plurality of latch receiving openings therethrough adjacent said top end for receiving latches n a mounting plate.

8. The floor box of claim 7 wherein said latch receiving openings bisect said support shoulders.

9. The floor box of claim 6 wherein said body has a plurality of inwardly extending longitudinal channels that terminate in spaced relationship to said top end to define said support shoulders.

10. A floor box comprising:
a tubular body having a top end and a peripheral wall;
a connector mounting plate receivable in said tubular body through said top end thereof;
cooperating latches and recesses on said peripheral wall of tubular body and said mounting plate for attaching said mounting plate within said tubular body in spaced relationship to said top end of said tubular body; and
said peripheral wall of tubular body having upwardly facing internal support shoulders engageable by said mounting plate.

11. A floor box comprising:
a tubular body having a top end and a peripheral wall;
a connector mounting plate receivable in said tubular body through said top end thereof;
cooperating latches and recesses on said peripheral wall of tubular body and said mounting plate for attaching said mounting plate within said tubular body in spaced relationship to said top end of said tubular body; and
said peripheral wall of said tubular body and said mounting plate having cooperating longitudinal alignment ribs and grooves for rotationally aligning said mounting plate within said tubular body.

12. The floor box of claim 11 wherein said longitudinal alignment ribs are on said peripheral wall of said tubular body and said grooves are in said mounting plate.

13. A floor box comprising:
a tubular body having a top end and a peripheral wall;
a connector mounting plate receivable in said tubular body through said top end thereof;
cooperating latches and recesses on said peripheral wall of tubular body and said mounting plate for attaching said mounting plate within said tubular body in spaced relationship to said top end of said tubular body; and
said tubular body having a generally cylindrical shape and said peripheral wall having a plurally of longitudinally extending circumferentially-spaced inwardly extending channels that provide upwardly facing shoulders within said tubular body spaced from said top end thereof for supporting said mounting plate thereon.

14. A floor box comprising:
a tubular body having a top end and a peripheral wall;
a connector mounting plate receivable in said tubular body through said top end thereof;
cooperating latches and recesses on said peripheral wall of tubular body and said mounting plate for attaching said mounting plate within said tubular body in spaced relationship to said top end of said tubular body;
said mounting plate having at least one opening therein for accommodating a data connector; and
said mounting plate having resilient mounting plate latches on opposite sides of said opening for attaching a data connector to said mounting plate.

15. A floor box comprising:
a generally cylindrical plastic tubular body configured for close reception through a circular hole;
said body having an upper end that is configured for attaching a circular flange to said body;
said body having a top end and internal upwardly facing support shoulders longitudinally spaced from said top end for supporting a generally circular mounting plate thereon; and
said body having a peripheral wall with a plurality of latch receiving openings therethrough adjacent said top end for receiving latches on the mounting plate.

16. The floor box of claim 15 wherein said latch receiving openings bisect said support shoulders.

17. The floor box of claim 15 wherein said body has a plurality of inwardly extending longitudinal channels that terminate in spaced relationship to said top end to define said support shoulders.

* * * * *

UNITED STATES PATENT AND TRADEMARK OFFICE
CERTIFICATE OF CORRECTION

PATENT NO.         : 7,078,616 B2
APPLICATION NO. : 10/948852
DATED                  : July 18, 2006
INVENTOR(S)        : Mark A. Roesch et al.

It is certified that error appears in the above-identified patent and that said Letters Patent is hereby corrected as shown below:

Column 4, line 40, delete "wail" and insert -- wall --.

Column 4, line 64, delete "n" and insert -- in --.

Column 5, line 40, delete "plurally" and insert -- plurality --.

Column 4, line 62, delete "flour" and insert -- floor --.

Signed and Sealed this

Fourteenth Day of November, 2006

JON W. DUDAS
*Director of the United States Patent and Trademark Office*